United States Patent [19]
Miyamoto et al.

[11] Patent Number: 4,736,262
[45] Date of Patent: Apr. 5, 1988

[54] BIDIRECTIONAL MAGNETIC RECORDING AND REPRODUCING DEVICE WITH AN AXIALLY ADJUSTABLE HEAD

[75] Inventors: Fumihiko Miyamoto; Tsuano Hasegawa; Ichiro Miyake, all of Saitama, Japan

[73] Assignee: Pioneer Electronic Corporation, Tokyo, Japan

[21] Appl. No.: 878,157

[22] Filed: Jun. 25, 1986

[30] Foreign Application Priority Data

Jun. 28, 1985 [JP] Japan .................................. 60-141882

[51] Int. Cl.⁴ ........................ G11B 5/54; G11B 5/024; G11B 21/08
[52] U.S. Cl. ........................................ 360/75; 360/109
[58] Field of Search ....................... 360/10.2, 10.3, 13, 360/14.1, 18, 19.1, 27, 32, 61, 62, 64, 66, 75, 77, 78, 107, 109, 118, 130.24, DIG. 1

[56] References Cited

U.S. PATENT DOCUMENTS 4,251,838 2/1981 Saito ..................................... 360/107
4,558,378 12/1985 Shibata et al. ......................... 360/13

FOREIGN PATENT DOCUMENTS 60-258749 12/1985 Japan ..................................... 360/27

Primary Examiner—Raymond F. Cardillo
Assistant Examiner—David L. Robertson
Attorney, Agent, or Firm—Sughrue, Mion, Zinn, Macpeak, and Seas

[57] ABSTRACT

A magnetic recording a playback device which records or reproduces slant-oriented areas on adjacent tracks by reversing the tape. One of the heads, for instance, the recording/reproducing head on a rotary drum is adjustable in the axial direction of the drum so that only one erase head is required.

5 Claims, 4 Drawing Sheets

FWD →
REV ←

BIDIRECTIONAL MAGNETIC RECORDING AND REPRODUCING DEVICE WITH AN AXIALLY ADJUSTABLE HEAD

BACKGROUND OF THE INVENTION

1. Field of the Invention

This invention relates to a magnetic recording and reproducing device typical of a video tape recorder.

2. Background Art

The present inventors previously proposed a magnetic recording and reproducing device in which tilted tracks formed by a rotary head are respectively divided into pluralities of areas and wherein signals are recorded in or reproduced from a first train of areas by moving a magnetic tape in a first direction and signals are recorded in or reproduced from a second train of areas by moving the magnetic tape in a second direction opposite to the first direction. Although this is disclosed in Japanese Patent Application No. 148190/84, this application was published on Jan. 17, 1986 and is not believed to qualify as prior art. FIG. 6(A) illustrates such tracks on the magnetic tape. In other words, the tracks are respectively divided into pluralities of areas (6 areas each according to this embodiment). The tracks 1 through 6 are formed on the basis of areas adjacent to each other in the travel direction of the magnetic tape. For instance, data are sequentially recorded in or reproduced from the areas A, B, C on track 1 by moving the magnetic tape in the forward direction. When the record or reproduction of the track 1 is completed the travel direction of the magnetic tape is reversed and then data are recorded or reproduced from the areas A, B, C on track 2.

FIG. 6(B) is a perspective view of a conventional rotary head for indicating the relationship in position on the head between record/reproduce heads 2 and 3 and erase heads 4 and 5. FIG. 5 shows the construction of a conventional rotary head for use in such device. The rotary head shown in FIG. 5 comprises a rotary drum 1 turning clockwise in the drawing. Record/reproduce heads 2 and 3 are attached to the rotary drum 1 at 180 degrees apart. An erase head 4 is used when the magnetic tape is moved in the forward direction and an erase head 5 is used when it is moved in the reverse direction. Both erase heads 4 and 5 are attached to the rotary drum 1.

When data is recorded on track 1, the magnetic tape is moved in the forward direction. Each of the record-/reproduce heads 2 and 3 diagonally traces the magnetic tape once until the rotary drum 1 completes a turn. The record/reproduce head 2 is actuated only in the areas A, C and E on track 1 and the record/reproduce head 3 is actuated in the areas B, D and F on track 1, so that data are sequentially recorded in the areas A, B, C, D, E and F on track 1.

On the other hand, the erase head 4, which is twice as wide as the track pitch (P) of the tilted tracks, is attached to the drum 1 in such a manner as to precede the record/reproduce heads 2 and 3 and the erase head 4 simultaneously traces the tracks 1 through 6 of two tilted tracks while the rotary drum 1 turns 6/10 of a revolution. In other words, the rotary drum 1 turns and causes the record/reproduce head 2 to trace the tilted tracks starting with the area A on track 1. The rotary drum 1 further turns and causes the record/reproduce head 3 to trace the tilted tracks starting with the area B on the track 1, whereas the erase head 4 is caused to simultaneously trace the tilted tracks starting with the area A on track 1 and those starting with the area B on the track 1 before the record/reproduce heads 2 and 3 thus trace the tilted tracks. The data stored in the areas A and B are simultaneously erased before any data are recorded therein because the erase head 4 is actuated with track 1 section only. The same operation is repeated thereafter.

On the other hand, when data is recorded on track 2, the magnetic tape is moved in the reverse direction. The rotary drum 1 turns and causes the record/reproduce head 2 to trace the tilted tracks starting with the area G on track 1 and further turns and causes the record/reproduce head 3 to trace the tilted tracks starting with the area F on track 1. The record/reproduce heads 2 and 3 are actuated in the areas A and B on track 2, whereby data are recorded therein. The erase head 5 is caused to simultaneously trace the tilted tracks starting with the area G on track 1 and those starting with the area F on track 1. The data stored in the areas A and B on track 2 are simultaneously erased before any data are recorded therein because the erase head 5 is actuated within the track 2 section only. The same operation is repeated thereafter.

The axial head position of the erase head must be set so that it may always precede the record/reproduce head but the axial head positions in the forward and reverse directions are different when the magnetic tape is moved in the forward and reverse directions to record or reproduce data. Accordingly, two erase heads, i.e., the erase head 4 for use in the forward direction and the erase head 5 for use in the reverse direction must be installed separately as shown in FIGS. 6(A) and 6(B). The disadvantage is that such an arrangement results in the increased number of parts and high production costs.

SUMMARY OF THE INVENTION

Accordingly an object of the present invention is to reduce the number of erase heads.

The magnetic recording and reproducing device according to the present invention uses tilted tracks formed by a rotary head are respectively divided into pluralities of areas and wherein signals are recorded in or reproduced from a first train of areas by moving a magnetic tape in a first direction and signals are recorded in or reproduced from a second train of areas by moving the magnetic tape in a second direction opposite to the first direction. The invention is characterized in that the rotary head comprises record/reproduce and erase heads, that the axial head position of at least either record/reproduce head or erase head is adjustable and that the axial head position of either head in the case where the signals are recorded in or reproduced from the first train of areas by moving the magnetic tape in the first direction is made different from the axial head position in the case where the signals are recorded in or reproduced from the second train of areas by moving the magnetic tape in the second direction. This variable head position allows the number of erase heads to be reduced.

DETAILED DESCRIPTION OF THE PREFERRED EMBODIMENTS

Figure 3:
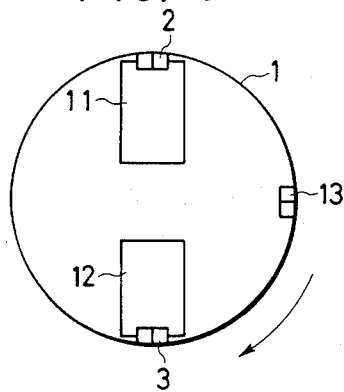
FIG. 3 is a plan view of a rotary head.
Figure 4:
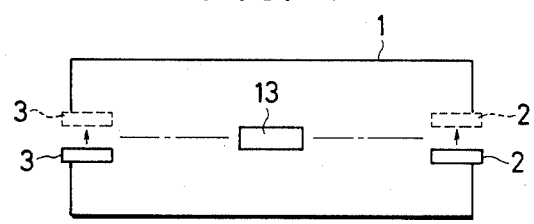
FIG. 4 is a side view of the rotary head of FIG. 3.
Figure 5:
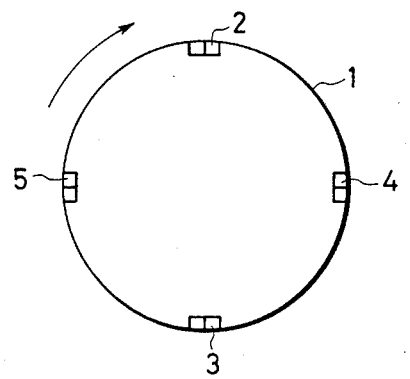
FIG. 5 is a plan view of a conventional rotary head.

The rotary head according to the present invention is constructed as shown in FIGS. 3 and 4. In other words, record/reproduce heads 2 and 3 are attached to rotary drum 1 at 180 degrees apart and are driven in the axial direction of the rotary drum 1 by driving means 11 and 12 with their head heights being adjustable. As the driving means 11 and 12, those for tracking control may be used. An erase head 13 is twice as wide as the track pitch of tilted tracks and is attached to a predetermined head height of the rotary drum 1 at 90 degrees apart from the record/reproduce heads 2 and 3.

Figure 1:
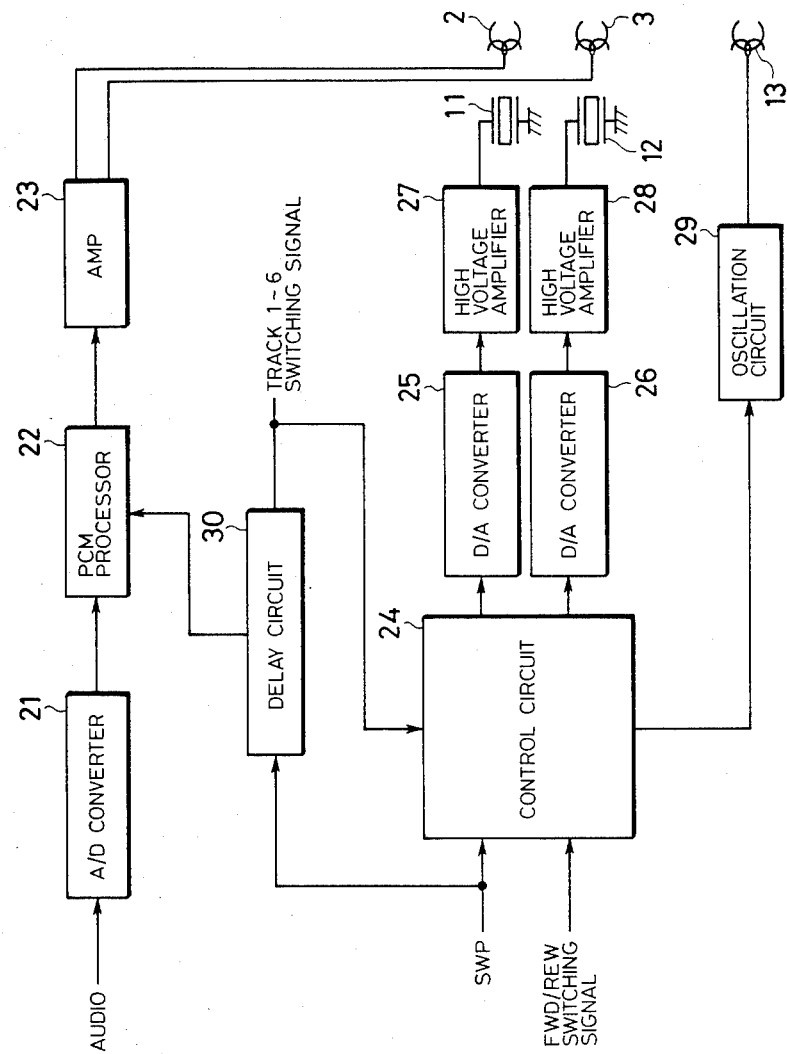
FIG. 1 is a block diagram of a magnetic recording and reproducing device embodying the present invention when signals are recorded.

FIG. 1 is a block diagram of a magnetic record playback for recording data using the rotary drum thus constructed. The magnetic recording and reproducing device shown in FIG. 1 includes an A/D converter 21 which converts a received analog audio signal to a digital signal. A PCM (pulse code modulation) processor 22 divides the signal received from the A/D converter 21 on a predetermined block basis, interleaving and adding a predetermined synchronization signal. Furthermore, the output signal of the PCM processor 22 is alternately supplied to the two record/reproduce heads 2 and 3 through a recording amplifier circuit 23. A control circuit 24 comprising a microcomputer and the like sends control signals to the drivers 11 and 12 through D/A converters 25 and 26 and high voltage amplifier circuits 27 and 28 so as to control the axial head position of the record/reproduce heads 2 and 3. The drivers 11 and 12 are each composed of a piezoelectric element. An oscillation circuit 29 a piezoelectric element. An oscillation circuit 29 supplies an erasing a.c. signal to the erase head 13. A delay circuit 30 delays a head switching pulse (SWP) in response to a track switching signal and supplies the pulse to the PCM processor 22.

Figure 6A:
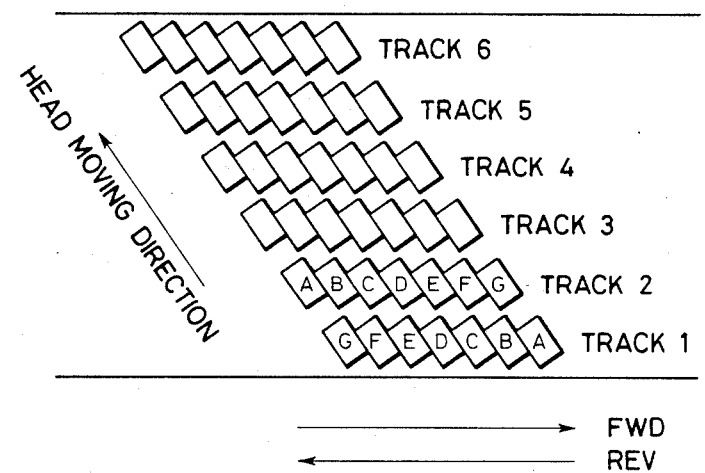
FIG. 6(A) is a typical plan view illustrating the aspect of tracks on a magnetic tape.
Figure 6B:
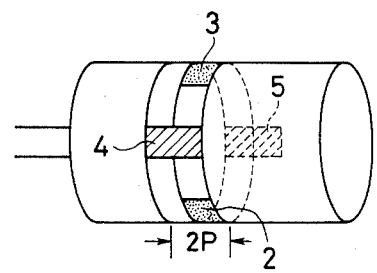
FIG. 6(B) is a perspective view of a conventional rotary head.

The operation of the magnetic record playback will now be described. When signals are recorded on, for instance, track 1 by moving the magnetic tape in the forward direction, the control circuit 24 supplies the control signals to the D/A converters 25 and 26. The signals are converted into analog signals by the D/A converters 25 and 26 and are supplied to the drivers 11 and 12 after being boosted by the high voltage amplifier circuits 27 and 28. Consequently, the record/reproduce heads 2 and 3 are positioned, for instance, at the axial head position shown by a solid line of FIG. 4 relative to the erase head 13. Needless to say, the record/reproduce heads 2 and 3 may be positioned automatically at this displaced position when no control signals are applied (control signals of zero voltage) with the displaced head position being reference head position. As the rotary drum 1 turns, accordingly, the erase head 13 is first caused to trace the tilted tracks starting with the area A on track 1 and those starting with the area B on track 1 in FIG. 6. Given that the frequency of the head switching pulse (a) is T, the control circuit 24 actuates the oscillation circuit 29 for a period between 3.5T/10 and 2.5T/10 before the rise or fall of the head switching pulse and supplies an erasing a.c. bias signal to the erase head 13. In consequence, the signals stored in the areas A and B are simultaneously erased. (timing (e) of FIG. 2).

On the other hand, when the rotary drum 1 turns, the record/reproduce head 2 traces the tilted tracks starting with the area A. When track 1 has been selected and designated by the tracks switching signal, the delay circuit 30 will not delay the head switching pulse received and supply the pulse as it is to the PCM processor 22. The PCM processor 22 produces signals for a period of T/10 immediately before the rise and fall of the head switching pulse (timing (d) of FIG. 2). Accordingly, the audio signal received from the A/D converter 21 is converted into a digital form (PCM) and the digital signal is supplied to the record/reproduce head 2 through the amplifier circuit 23 before being recorded in the area A on the track 1 (timing (b) of FIG. 2). As the record/reproduce head 2 is not actuated in the section from the track 2 up to the track 6, no signals are recorded in that section.

Figure 2:
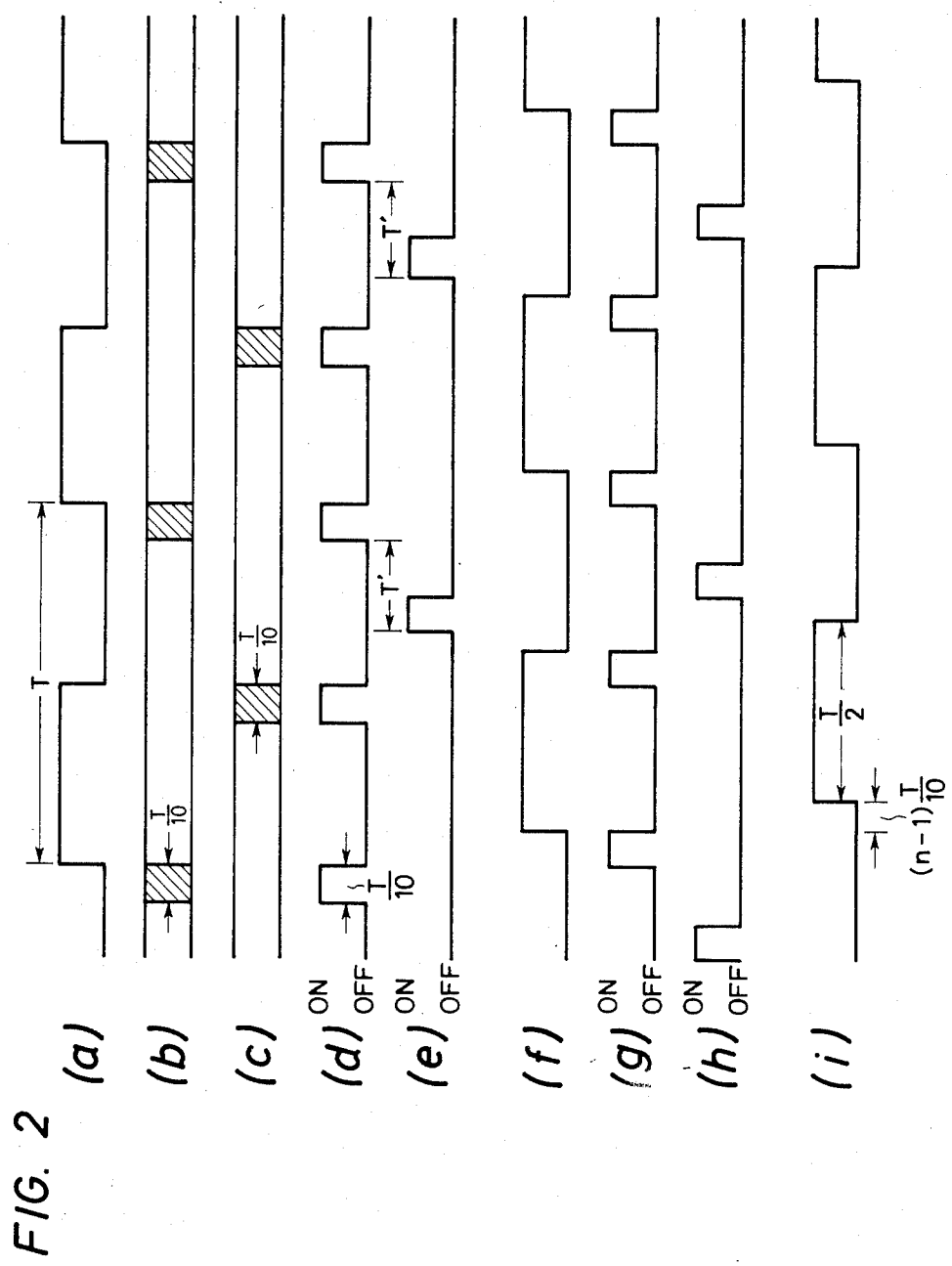
FIG. 2, consisting of (a) through (i), is a timing chart of FIG. 1.

The time difference (T') between rise or fall of the two pulses shown by timings (d) and (e) in FIG. 2 corresponds to a period passing between the trace of the erase head 13 on the track 1 and the following trace of the record/reproduce head 2 on the track 1. As an erase head and a record/reproduce head are attached to the rotary drum 1 at 90 degrees apart in an embodiment of the invention, the period (T') passing between the trace of the erase head and the following trace of the record/reproduce head on the track 1 is set to 2.5T/10. However, the angular separation between an erase head and a record/reproduce head is not limited to 90 degrees, and therefore the period passing between the trace of the erase head on a track and the following trace of the record/reproduce head on the track is not limited to 2.5T/10. Furthermore, a signal generating means (not shown) which generates a signal every one rotation of a head may be designed in the head to trigger the head switching pulse in response to the signal from the signal generating means. For example, a tag heading may be used for the above purpose. However, a method for triggering the head switching pulse is not limited to the above generating means.

When the rotary drum 1 further turns, causing the first record/reproduce head 2 to start tracing track 6, the second record/reproduce head 3 starts tracing the tilted tracks starting with the area B on track 1. For a period of T/10 immediately before the rise and decay of the head switching pulse is started, the PCM processor 22 is again actuated (timing (d) in FIG. 2) and caused to send the output signal to the amplifier circuit 23. As a result, a signal is recorded in the area B on track 1 wherein the recorded signal has already been erased (timing (c) in FIG. 2). The same operation is repeated thereafter and signals are successively recorded in the areas A, B, C, D, etc. on track 1.

On the other hand, when data is recorded on track 2, the magnetic tape is moved in the reverse direction. Moreover, the control circuit 24 applies the control signals to the drivers 11 and 12 through the D/A converters 25 and 26 and the high voltage amplifier circuits 27 and 28 so that the record/reproduce heads 2 and 3 are displayed to, e.g., an axial head position shown by a broken line of FIG. 4 relative to the erase head 13. This position corresponds to a displacement equivalent to 2 track pitches relative to the position shown by the actual line. The delay circuit 30, whose delay quantity becomes (n−1)T/10 (timing (i) in FIG. 2) when a track n (wherein n represents integers of 1 through 6) is selected, delays the head switching pulse by a period of T/10 for each area and produces the pulse (timing (f) in FIG. 2). The PCM processor 22 produces signals in the areas corresponding to track 2 (timing (g) in FIG. 2). Moreover, the control circuit 24 supplies the erasing a.c. bias signal to the erase head 13 at a timing corresponding to track 2. In that case, it is understood that the erase head 13 has been displaced by two track pitches relative to the case where the magnetic tape is moved in the forward direction. Even if the magnetic tape is moved in the reverse direction, accordingly, the erase head 13 is caused to simultaneously trace the tilted tracks starting with the area G on track 1 and those starting with the area F on track 1 as the rotary drum 1 turns. Since the erase head 13 is actuated on track 2, the signals in the areas A and B are erased (timing (h) in FIG. 2). As the rotary drum 1 turns and causes the first record/reproduce head 2 to trace the tilted tracks starting with the area G and further turns and causes the second record/reproduce head 3 to trace the tilted tracks starting with the area F, both record/reproduce heads are actuated in the areas A and B on track 2, whereby signals are successively recorded therein. The above operation is repeated and signals are successively recorded in the areas A, B, C, D on track 2.

The displacement of the record/reproduce heads 2 and 3 can be set at one track pitch by arranging the erase head 13 in the immediate front of the record/reproduce head 2. Moreover, the axial head position of the erase head may be displaced and, provided that the same operation is conducted at the time of reproducing, the signal in each area on a desired track may be erased thereat.

As set forth above, the magnetic recording and reproducing device according to the present invention wherein tilted tracks formed by a rotary head are respectively divided into pluralities of areas and wherein signals are recorded in or reproduced from a first train of areas by moving a magnetic tape in a first direction and signals are recorded in or reproduced from a second train of areas by moving the magnetic tape in a second direction opposite to the first direction is characterized in that the rotary head comprises record/reproduce and erase heads, that the axial head position of either the record/reproduce head or the erase head is adjustable and that the head height of either head in the case where said signals are recorded in or reproduced from the first train of areas by moving the magnetic tape in the first direction is made different from the head height in the case where the signals are recorded in or reproduced from the second train of areas by moving the magnetic tape in the second direction in order to reduce the number of erase heads. Consequently, not only the number of parts but also production costs can be reduced.

What is claimed is:

1. A magnetic recording and reproducing device wherein tilted tracks formed by a rotary head are respectively divided into pluralities of areas and wherein signals are recorded in or reproduced from a first train of areas by moving a magnetic tape in a first direction and signals are recorded in or reproduced from a second train of areas by moving said magnetic tape in a second direction opposite to said first direction, characterized in that, said device comprising:
   a rotary head comprising a rotary drum and a record-/reproduce head and an erase head mounted on a circumferential surface of said drum;
   means for adjusting an axial position of at least one of said record/reproduce and erase heads along the axial direction of said rotary drum; and
   means for controlling said adjusting means to move said adjusted head to a first axial position where signals are recorded or reproduced in a first train of areas during movement of said tape in a first direction and to move said adjusted head to a second axial position where signals are recorded or reproduced in a second train of areas during movement of said tape in a direction opposite said first position.

2. A recording and reproducing device as recited in claim 1, wherein said record/reproduce head is activated only when one of said plurality of areas is recorded or reproduced.

3. a recording and reproducing device as recited in claim 2, wherein said signals are subjected to pulse code modulation for recording.

4. A recording and reproducing device as recited in claim 3, wherein there are two recording and reproducing heads located 180° apart on a circumference of said rotary drum.

5. A recording and reproducing head as recited in claim 4, wherein there is a single erase head located midway between said recording and reproducings heads on said rotary drum.

* * * * *